June 21, 1949.  D. P. FAULK  2,473,640
ELECTRICAL CIRCUITS
Filed Nov. 5, 1947
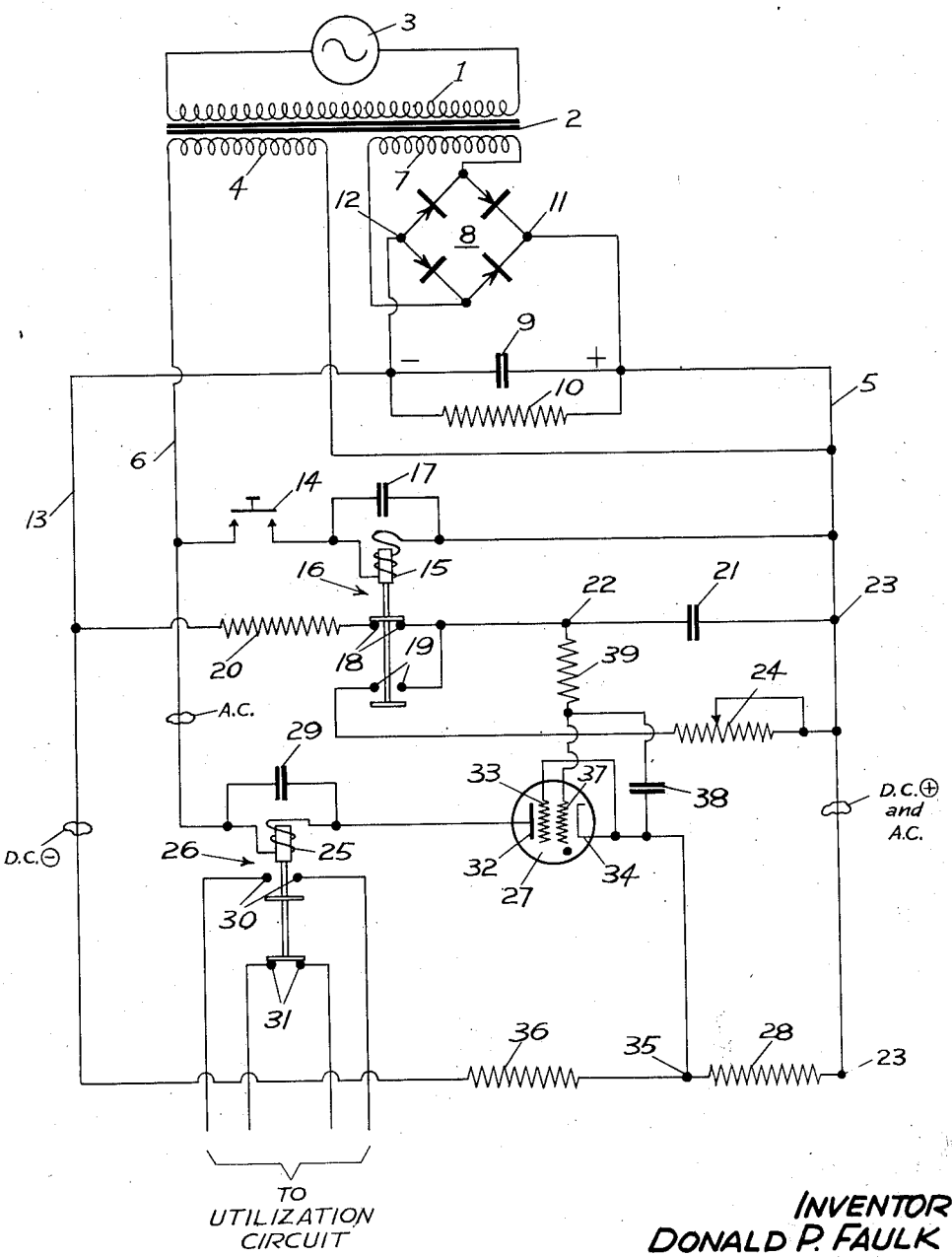
INVENTOR
DONALD P. FAULK
BY
ATT'Y Patented June 21, 1949

2,473,640

UNITED STATES PATENT OFFICE 2,473,640

ELECTRICAL CIRCUITS

Donald P. Faulk, Waltham, Mass., assignor to Raytheon Manufacturing Company, Newton, Mass., a corporation of Delaware Application November 5, 1947, Serial No. 784,121

13 Claims. (Cl. 315—355)

1

This invention relates to electrical circuits, and more particularly to a timing circuit useful, for example, in sequencing circuit combinations for electric welding systems.

An object of this invention is to provide a timing circuit which is very accurate.

Another object is to devise a timing circuit which times substantially constant intervals irrespective of line voltage variations.

A further object is to devise a timing circuit which is capable of high-speed repetitive operation, that is, is capable of use to measure successive time intervals with only a very short time between the end of one interval and the beginning of the next succeeding interval.

The foregoing and other objects of the invention will be best understood from the following description of an exemplification thereof, reference being had to the accompanying drawing, wherein the single figure is a diagrammatic representation of a circuit embodying the invention.

Now referring to the drawing, the primary I of a main power transformer 2 is supplied from a power source 3, which may be the ordinary 110-volt, 60-cycle power lines. One of the secondary windings 4 of transformer 2 is connected to supply alternating current of suitable voltage to leads 5 and 6, so that alternating current appears between said leads 5 and 6. Another secondary winding 7 of transformer 2 is connected to supply the diagonally opposite input terminals of a bridge rectifier 8. A smoothing condenser 9 and resistor 10, connected in parallel with each other, are connected across the diagonally opposite output terminals 11 and 12 of rectifier 8. Positive rectifier output terminal 11 is connected to lead 5, while negative rectifier output terminal 12 is connected to lead 13, so that direct current appears between leads 5 and 13, with lead 5 being positive and lead 13 being negative.

Across the alternating current leads 5 and 6 are connected in series a switch 14, which may be a foot switch, and the operating winding 15 of a relay 16. A condenser 17 may be connected across winding 15. Relay 16, when energized, opens a pair of normally-closed contacts 18 and closes a pair of normally-open contacts 19. Contacts 18 are connected in series with a resistor 20 and a timing condenser 21 across the direct current supply leads 5 and 13. In the standby condition, with relay 16 deenergized and contacts 18 closed, a charging circuit is completed for condenser 21 from the direct current source through resistor 20, so that under these conditions condenser 21 is charged from the source 5, 13 with terminal 22 of said condenser negative with respect to terminal 23 thereof or with respect to lead 5. Resistor 20 has a low value of resistance, such that condenser 21 charges almost instantaneously when contacts 18 close. Therefore, high-speed repetitive operations are obtainable. When relay 16 is energized, contacts 18 are opened and this condenser charging circuit is broken.

A discharge circuit is provided for condenser 21, this circuit being traceable from terminal 22, through contacts 19 and potentiometric resistor 24 in series, to terminal 23. Thus, when contacts 19 are closed by the energization of relay 16, condenser 21 is caused to discharge at a rate determined by the position of the manually-movable contact on resistor 24.

Across the alternating current leads 5 and 6 are also connected in series the operating winding 25 of a relay 26, the anode-cathode path of a grid-controlled gaseous discharge device 27, such as a thyratron, and a resistor 28. A holding condenser 29 is connected across winding 25. Relay 26, when energized by the firing of tube 27 and the completion of the relay energization circuit just described, closes a pair of normally-open contacts 30 and opens a pair of normally-closed contacts 31. These pairs of contacts 30 and 31 may be connected to any suitable utilization circuit, for example, another timing section or circuit similar to the one to be described herein, to constitute any desired sequencing combination. As stated, the anode 32 of tube 27 is connected to lead 6 through relay winding 25. The shield grid 33 of tube 27 is connected directly to cathode 34 of said tube.

Cathode 34 is connected to a point 35 between two resistors 36 and 28 which are connected in series with each other across the direct current leads 5 and 13. Resistors 36 and 28 have such resistance that point 35, and therefore also cathode 34, are always at a potential which is substantially negative with respect to lead 5, even though said cathode is connected through resistor 28 to the terminal 5 of the alternating current source opposite to the terminal 6 to which anode 32 of tube 27 is connected. The control grid 37 of tube 27 is connected to cathode 34 through a bypass condenser 38.

Relay 26 is controlled by tube 27, and in order to apply the potential of timing condenser 21 to the control grid 37 of said tube, so as to control the same, control grid 37 is connected, through a resistor 39, to the terminal 22 of condenser 21, the opposite terminal 23 of said condenser being connected, of course, to lead 5, to which cathode 34 is also connected through resistor 28.

In the standby condition illustrated, switch 14 is open, relay 16 is deenergized and contacts 18 are closed, so that condenser 21 is charged from the direct current source to the voltage of said source, with its terminal 22 negative with respect to its terminal 23 or with respect to lead 5. Going around the grid-cathode circuit of tube 27, from cathode 34 through grid 37, resistor 39, condenser 21, and resistor 28, back to said cathode, it will be seen that the potential of condenser 21 is algebraically added to the voltage drop across resistor 28 in order to determine the potential of grid 37 with respect to cathode 34. Since the end 35 of resistor 28 is negative with respect to lead 5 or terminal 23, while terminal 23 is positive with respect to terminal 22, it should be seen that the voltage of condenser 21 bucks, or is in series opposition with, the voltage drop across resistor 28. However, since the voltage of condenser 21 is that of source 8, while the drop across resistor 28 is substantially less than that of said source, the grid 37 of tube 27 is biased substantially negatively with respect to cathode 34, tube 27 is nonconducting and relay 26 is unenergized.

Now, when switch 14 is operated to begin the measured or controlled time interval, a circuit is completed through winding 15 of relay 16, energizing said relay to open contacts 18 and close contacts 19. The opening of contacts 18 breaks the charging circuit of condenser 21, disconnecting it from the direct current supply 5, 13.

The closing of contacts 19 completes a discharge circuit for condenser 21 through resistor 24, and said condenser discharges through said resistor at an adjustable rate determined by the position of the movable contact on said resistor.

Tube 27 is fired or caused to conduct if its anode has a sufficiently high positive potential with respect to its cathode and if its grid has a certain predetermined potential with respect to its cathode. Depending upon the type of tube used, the grid potential for firing may be somewhat negative, zero, or somewhat positive with respect to the cathode. It should be apparent that, if contacts 19 are held closed for a sufficient length of time, the condenser 21 will eventually be completely discharged, or the charge thereon will be reduced to zero.

When timing condenser 21 has been discharged to a voltage (between points 22 and 23) such that, when it is algebraically added (which means subtracted in this case, since the voltages are connected in series opposition) to the voltage drop across resistor 28 (between points 23 and 35), the predetermined grid firing potential of the tube is reached, tube 27 becomes conductive, energizing relay 26 from the alternating current source 5, 6 and marking the end of the time interval.

Thus, the time between the operation of switch 14 and the firing of tube 27 or the energization of relay 26 is the measured time interval, and this time interval is controlled by the discharge of timing condenser 21.

By connecting the cathode 34 to a point 35 which is always substantially negative with respect to lead 5 or point 23, several advantages are obtained. Since the cathode 34 is maintained or biased in this way at a fixed negative potential with respect to the grid 37, and since the voltages of condenser 21 and resistor 28 are connected in series opposition, condenser 21 does not need to be completely discharged before tube 27 can conduct, but need be discharged only to a voltage such that when said voltage is algebraically added to the voltage drop across resistor 28, the grid firing potential of the tube is reached. This voltage to which condenser 21 need be discharged is ordinarily substantially greater than zero, since there is a substantial voltage drop across resistor 28. The discharge of a condenser through a resistor, such as that of condenser 21 through resistor 24, is known, by those skilled in the art, to follow an exponential curve. By eliminating the use of the later portion of the condenser discharge curve for timing purposes, only the first portion of the curve is used. This first portion is very nearly linear, and if only this first portion is used, as in the circuit of the present invention, a very accurate timing means is provided.

By connecting the cathode in the manner disclosed, so that the voltage drop across resistor 28 is connected in series opposition to the voltage of the timing condenser in the grid-cathode circuit, the effect of line voltage variations on the measured time intervals is substantially eliminated. If the line voltage decreases, for example, condenser 21 is charged to a lower voltage than it is under normal conditions, so that if said condenser had to be discharged to a fixed value of voltage in order to fire tube 27, a shorter time interval would be measured. However, when the line voltage decreases, there will be a smaller voltage drop across resistor 28, since resistors 36 and 28 are connected in series across the line. This smaller voltage drop means a smaller negative bias on cathode 34 with respect to grid 37. Since condenser 21 must discharge to a voltage such that, when it is added algebraically to the voltage drop across resistor 28, the grid firing potential of the tube is reached, in order to fire tube 27, condenser 21 must under these conditions discharge to a lower voltage than ordinarily, in order to fire tube 27, this discharge to a lower voltage tending to increase the time interval. The first of the above effects tends to decrease the length of the time interval, while the latter effect tends to increase the length of said interval. By proper choice of circuit constants, substantially perfect balancing of the effects may be achieved, so that substantially constant time intervals are measured irrespective of drops in line voltage.

Conversely, when the line voltage increases, condenser 21 charges to a higher voltage, tending to increase the time interval. The voltage drop across resistor 28 increases in this case, tending to decrease the time interval, since condenser 21 must discharge only to a voltage differing from the voltage drop across resistor 28 by a predetermined amount, in order to fire tube 27. Again, these effects are in opposite directions with respect to the time interval being measured, so that substantially constant time intervals are measured irrespective of increases in line voltage.

As long as relay 16 remains energized and contacts 19 remain closed, tube 27 will remain conducting after it is once fired and relay 26 will therefore remain energized, since condenser 21 stays discharged to a voltage less than the voltage drop across resistor 28 and grid 37 therefore has a positive potential with respect to cathode 34.

If switch 14 has been maintained closed during the time interval being measured, as may be the case, in order to reset the circuit for another time interval measurement it is merely necessary to open said switch. When switch 14 is opened, relay 16 is deenergized, closing contacts 18 and opening contacts 19. The opening of contacts 19 breaks the discharge circuit for condenser 21, while the closing of contacts 18 completes the charging circuit for said condenser, which then charges substantially instantaneously to the full voltage of the direct current source 5, 13, with terminal 22 negative with respect to terminal 23. When the voltage of condenser 21 rises above the voltage drop across resistor 28, which it does almost instantaneously after relay 16 is deenergized, or in other words when point 23 is more positive with respect to point 22 than with respect to point 35, a potential negative with respect to cathode 34 is applied to control grid 37, and tube 27 reverts to the non-conducting condition when the alternating voltage supplied to its anode 32 from alternating current lead 6 falls to a value insufficient to maintain the arc therein. Relay 26 is thereby deenergized and the circuit is ready for another operation. Since the condenser 21 is charged substantially instantaneously directly from the direct current source 5, 13, the time needed between successive time intervals is extremely short.

A complete welding sequence timer may be composed of any number of typical timing sections such as that shown, arranged in any desired sequence combination to form any of the common types of sequence timer.

Of course, it is to be understood that this invention is not limited to the particular details as described above, as many equivalents will suggest themselves to those skilled in the art. It is accordingly desired that the appended claims be given a broad interpretation commensurate with the scope of this invention within the art.

What is claimed is:

1. A timing circuit including, in combination, a timing condenser, a circuit connecting said condenser across a source of electrical energy for charging the same therefrom, a voltage divider connected across said source, said condenser being connected to said voltage divider with the voltage across said condenser being in series opposition with the voltage drop across a portion of said divider, and a circuit energized by a predetermined small difference between said condenser voltage and said voltage drop for producing a signal.

2. A timing circuit including, in combination, a timing condenser, a controllable circuit connecting said condenser across a source of electrical energy for charging the same therefrom, a controllable discharge circuit for said condenser, a voltage divider connected across said source, said condenser being connected to said voltage divider, with the voltage across said condenser in series opposition with the voltage drop across a portion of said divider, a switch for opening said charging circuit and for closing said discharge circuit at the beginning of a time interval, and a circuit energized by a predetermined small difference between said condenser voltage and said voltage drop for producing a signal to end the time interval.

3. A timing circuit including, in combination, a timing condenser, a relay having a pair of normally-open and a pair of normally-closed contacts, said normally-closed contacts being connected in series with said condenser across a source of electrical energy for charging the same therefrom, said normally-open contacts and a resistor being connected in series across said condenser, a voltage divider connected across said source, said condenser being connected to said voltage divider, the voltage across said condenser being in series opposition with the voltage drop across a portion of said divider, a circuit for energizing said relay to open its normally-closed contacts and close its normally-open contacts at the beginning of a time interval, and a circuit energized by a predetermined small difference between said condenser voltage and said voltage drop for producing a signal to end the time interval.

4. A timing circuit including, in combination, a timing condenser, a circuit including a switch for connecting said condenser across a source of electrical energy and charging and discharging said condenser, a voltage divider connected across said source, one terminal of said condenser being connected to one end of said voltage divider, an electron discharge tube having at least anode, cathode, and grid elements, said anode and cathode being connected across a source of electrical energy to supply said tube, the other terminal of said condenser being connected to said grid, and said cathode being connected to an intermediate point on said voltage divider, to thereby connect two voltages in series opposition between said cathode and said grid, one of said voltages being the voltage across said condenser and the other being the voltage drop across that portion of said divider between said intermediate point and said one end thereof, whereby discharge of said tube is controlled by said switch.

5. A timing circuit including, in combination, a timing condenser, said condenser being connected across a source of direct current for charging and discharging said condenser, a voltage divider connected across said source, one terminal of said condenser being connected to one end of said voltage divider, a gaseous discharge device having at least anode, cathode, and grid elements, means connecting said anode and cathode across a source of alternating current to supply said device, means connecting the other terminal of said condenser to said grid, and means connecting said cathode to an intermediate point on said voltage divider, to thereby connect two voltages in series opposition between said cathode and said grid, one of said voltages being the voltage across said condenser and the other being the voltage drop across that portion of said divider between said intermediate point and said one end thereof.

6. A timing circuit including, in combination, a timing condenser, a controllable circuit connecting said condenser across a source of electrical energy for charging the same therefrom, a controllable discharge circuit for said condenser, a voltage divider connected across said source, one terminal of said condenser being connected to one end of said voltage divider, an electron discharge tube having at least anode, cathode, and grid elements, means connecting said anode and cathode across a source of electrical energy to supply said tube, means connecting the other terminal of said condenser to said grid, said cathode being connected to an intermediate point on said voltage divider, to thereby connect two voltages in series opposition between said cathode and said grid, one of said voltages being the voltage across said condenser and the other being the voltage drop across that portion of said divider between said intermediate point and said one end thereof, and means for opening said charging circuit and for closing said discharge circuit at the beginning of a time interval.

7. A timing circuit including, in combination, a timing condenser, means connecting said condenser across a source of electrical energy for charging the same therefrom, a controllable discharge circuit for said condenser, a voltage divider connected across said source, one terminal of said condenser being connected to one end of said voltage divider, a gaseous discharge device having at least anode, cathode, and grid elements, means connecting said anode and cathode across a source of electrical energy to supply said device, current-responsive controlling means connected in series with the anode-cathode path of said device, means connecting the other terminal of said condenser to said grid, and means connecting said cathode to an intermediate point on said voltage divider, to thereby connect two voltages in series opposition between said cathode and said grid, one of said voltages being the voltage across said condenser and the other being the voltage drop across that portion of said divider between said intermediate point and said one end thereof.

8. A timing circuit including, in combination, a timing condenser, a circuit comprising said condenser connected across a source of direct current for charging the same therefrom, a gaseous discharge device having at least anode, cathode, and grid elements, a voltage divider connected across said source, a circuit connecting said anode and cathode across a source of alternating current with said cathode being connected to an intermediate point on said voltage divider, and said condenser being connected between said cathode and said grid to control conduction in said device by the voltage across said condenser.

9. A timing circuit including, in combination, a timing condenser, means connecting said condenser across a source of direct current for charging the same therefrom, a controllable discharge circuit for said condenser, a gaseous discharge device having at least anode, cathode, and grid elements, a voltage divider connected across said source, means connecting said anode and cathode across a source of alternating current with said cathode being connected to an intermediate point on said voltage divider, and means connecting said condenser between said cathode and said grid in such a way that the voltage across said condenser is in series opposition with the voltage drop across that portion of said divider between said intermediate point and the end thereof common to said direct current source and to said condenser.

10. A timing circuit including, in combination, a timing condenser, means connecting said condenser across a source of direct current for charging the same therefrom with one terminal thereof, a controllable discharge circuit for said condenser, negative with respect to the other terminal thereof, a gaseous discharge device having at least anode, cathode, and grid elements, a voltage divider connected across said source, means connecting said anode and a cathode across a source of alternating current with said cathode being connected to an intermediate point on said voltage divider, and means connecting the negative terminal of said condenser to said grid and the positive terminal thereof to one end of said divider to connect the voltage across said condenser in series opposition with the voltage drop across that portion of said divider between said intermediate point and said one end thereof.

11. A timing circuit including, in combination, a timing condenser, a controllable circuit connecting said condenser across a source of direct current for charging the same therefrom with one terminal thereof negative with respect to the other terminal thereof, a controllable discharge circuit for said condenser, a gaseous discharge device having at least anode, cathode, and grid elements, a voltage divider connected across said source, means connecting said anode and cathode across a source of alternating current with said cathode being connected to an intermediate point on said voltage divider, means connecting the negative terminal of said condenser to said grid and the positive terminal thereof to one end of said divider to connect the voltage across said condenser in series opposition with the voltage drop across that portion of said divider between said intermediate point and said one end thereof, and means for opening said charging circuit and for closing said discharge circuit at the beginning of a time interval.

12. A timing circuit including, in combination, a timing condenser, a relay having a pair of normally-closed contacts and a pair of normally-open contacts, said normally-closed contacts being connected in series with said condenser across a source of direct current for charging the same therefrom with one terminal thereof negative with respect to the other terminal thereof, said normally-open contacts and a resistor being connected in series across said condenser, a gaseous discharge device having at least anode, cathode, and grid elements, means connecting said anode and cathode across a source of alternating current, means connecting the negative terminal of said condenser to said grid and the positive terminal thereof to said cathode to prevent conduction in said device while said condenser is fully charged, and means for energizing said relay to open its normally-closed contacts and close its normally-open contacts at the beginning of a time interval, said condenser then discharging to permit conduction in said device to end the time interval.

13. A timing circuit including, in combination, a timing condenser, a relay having a pair of normally-closed and a pair of normally-open contacts, said normally-closed contacts being connected in series with said condenser across a source of direct current for charging the same therefrom with one terminal thereof negative with respect to the other terminal thereof, said normally-open contacts and a resistor being connected in series across said condenser, a gaseous discharge device having at least anode, cathode, and grid elements, a voltage divider connected across said source, means connecting said anode and cathode across a source of alternating current with said cathode being connected to an intermediate point on said voltage divider, means connecting the negative terminal of said condenser to said grid and the positive terminal thereof to one end of said divider to connect the voltage across said condenser in series opposition with the voltage drop across that portion of said divider between said intermediate point and said one end thereof, and means for energizing said relay to open its normally-closed contacts and close its normally-open contacts at the beginning of a time interval.

DONALD P. FAULK.

REFERENCES CITED

The following references are of record in the file of this patent:

UNITED STATES PATENTS

| Number | Name | Date |
|---|---|---|
| 1,552,321 | Lea | Sept. 1, 1925 |
| 2,304,207 | Richardson et al. | Dec. 8, 1942 |
| 2,434,157 | Heppeard | Jan. 6, 1948 |
| 2,442,578 | Audier | June 1, 1948 |

Certificate of Correction

Patent No. 2,473,640.

June 21, 1949.

DONALD P. FAULK

It is hereby certified that errors appear in the printed specification of the above numbered patent requiring correction as follows:

Column 6, line 6, claim 4, for "and", first occurrence, read *for*; column 7, line 51, claim 10, after the syllable and comma "of," insert *negative with respect to the other terminal thereof*; lines 52 and 53, same claim, strike out the words and comma "negative with respect to the other terminal thereof,"; line 56, same claim, before "cathode" strike out "a";

and that the said Letters Patent should be read with these corrections therein that the same may conform to the record of the case in the Patent Office.

Signed and sealed this 29th day of November, A. D. 1949.

[SEAL]

THOMAS F. MURPHY,
*Assistant Commissioner of Patents.*